United States Patent [19]

Briggs et al.

[11] Patent Number: 4,776,731
[45] Date of Patent: Oct. 11, 1988

[54] METHOD AND APPARATUS FOR CONVEYING SOLIDS USING A HIGH VELOCITY VACUUM

[75] Inventors: Aubrey C. Briggs, Carnegie, Pa.; R. Alan Duckworth, Farnham, England

[73] Assignee: Briggs Technology, Inc., Pittsburgh, Pa.

[21] Appl. No.: 935,404

[22] Filed: Nov. 26, 1986

[51] Int. Cl.$^4$ .............................................. B65G 53/14
[52] U.S. Cl. ...................... 406/153; 406/152; 406/83; 406/159; 406/194; 417/198; 417/179
[58] Field of Search ...................... 406/61, 83, 93, 151, 406/152, 153, 154, 157, 159, 171, 194; 15/409; 417/179, 196, 197, 198

[56] References Cited

U.S. PATENT DOCUMENTS

| | | | |
|---|---|---|---|
| 2,061,032 | 11/1936 | Huff | 15/409 X |
| 2,475,832 | 7/1949 | Gilliland . | |
| 2,923,959 | 2/1960 | Huber . | |
| 3,219,394 | 11/1965 | Moss et al. | 406/152 X |
| 3,262,318 | 7/1966 | Decker | 406/152 X |
| 3,301,606 | 1/1967 | Bruno . | |
| 3,436,125 | 4/1969 | Doherty et al. | 406/152 X |
| 3,444,584 | 5/1969 | Cote . | |
| 3,512,841 | 5/1970 | Kollasch et al. | 406/153 X |
| 3,545,886 | 12/1970 | Chalom . | |
| 3,672,790 | 6/1972 | White et al. | 417/197 X |
| 3,922,753 | 12/1975 | Aberilla . | |
| 3,967,341 | 7/1976 | Gavin . | |
| 3,971,096 | 7/1976 | Renholt . | |
| 4,055,870 | 11/1977 | Furutsutsumi . | |
| 4,227,863 | 10/1980 | Sommerer . | |
| 4,240,173 | 12/1980 | Sherrill . | |
| 4,264,212 | 4/1981 | Tookey . | |
| 4,322,897 | 4/1982 | Brassfield . | |
| 4,400,138 | 8/1983 | Baer . | |
| 4,487,553 | 12/1984 | Nagata . | |
| 4,562,612 | 1/1986 | Williams et al. . | |

FOREIGN PATENT DOCUMENTS

| | | | |
|---|---|---|---|
| 628239 | 8/1978 | U.S.S.R. | 406/152 |
| 659484 | 4/1979 | U.S.S.R. | 406/61 |

Primary Examiner—Galen Barefoot
Assistant Examiner—James M. Kannofsky
Attorney, Agent, or Firm—Parmelee, Miller, Welsh & Kratz

[57] ABSTRACT

A method and apparatus for pneumatically conveying solid materials such as soil, stones and the like. A hollow bored tube having an inlet end, a discharge end and an intermediate injector section is provided with at least one nozzle of the converging/diverging type within the injector section. A compressor supplies air at a pressure of about 90 psig to the nozzle to create an air stream within the tube directed toward the discharge end thereof, at a velocity in the supersonic regime. A strong vacuum is thus created in the region of the inlet end to provide rapid evacuation of the solids into the tube for conveyance therethrough and ejection at the discharge end thereof.

24 Claims, 4 Drawing Sheets

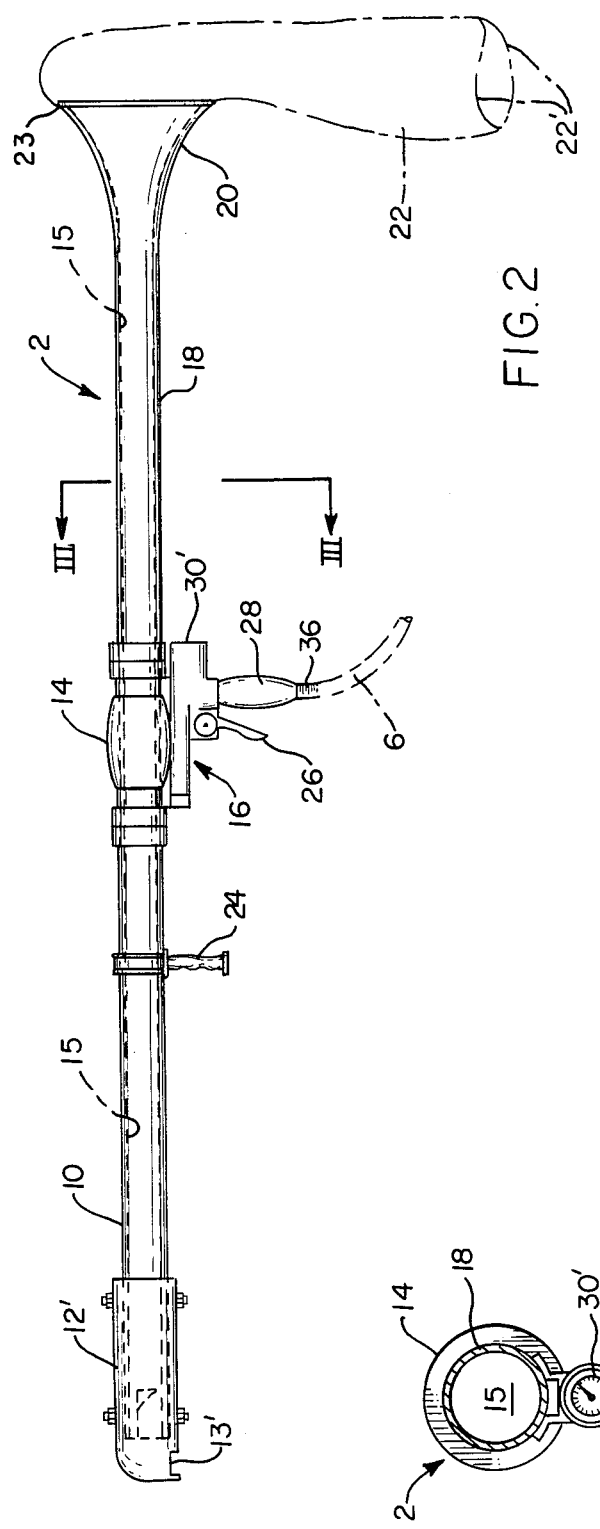
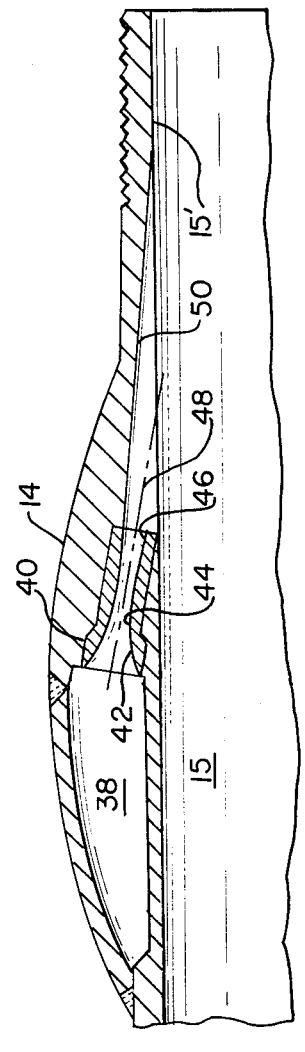
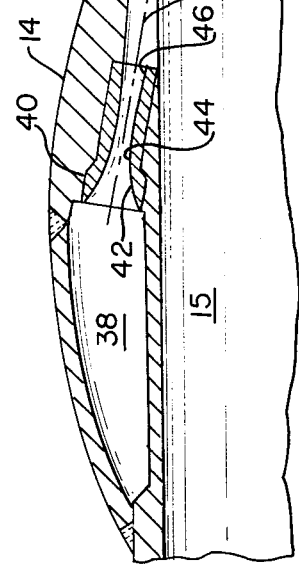

METHOD AND APPARATUS FOR CONVEYING SOLIDS USING A HIGH VELOCITY VACUUM

BACKGROUND OF THE INVENTION

The present invention relates generally to the art of conveying materials, such as soil, stones and like granular solids from an excavation site for delivery to a remote location. More particularly, the present invention relates to a method and apparatus for conveying such granular solids from holes, trenches and like excavation sites, which employs a very strong vacuum generated by a high velocity stream of a gas, preferably flowing in the supersonic regime. The present invention is particularly suited, though not exclusively, for use in connection with excavation work being carried out in close proximity to utility lines, conduit, pipe and the like, where conventional mechanical equipment may cause damage to such service lines and, in the case of natural gas pipe, can even create explosion hazards.

Heretofore, when excavation has been required in close proximity to fragile utility lines, it has been necessary to convert from the usual mechanized equipment, such as power shovels, backhoes or the like and employ hand excavation tools such as picks and shovels to complete the task. Hand excavation not only results in a dramatic reduction in the material removal rate, but it also does not completely solve the problem of inadvertent striking and damaging of buried utility lines and pipes.

The problem of loosening soil in such excavation work has been solved by the invention disclosed in co-pending patent invention entitled: "Method and Apparatus for Excavating Soil and the Like Using a Supersonic Gas", U.S. Ser. No. 877,280, filed June 23, 1986 and assigned to the assignee of the present application. The invention disclosed therein is directed to a method and apparatus which employs a nozzle supplied with high pressure gas, preferably air, to generate a supersonic jet which creates fissures and cavities in a soil mass. The impacting, high velocity air stream becomes stagnated within the soil cavities, causing rapid fracture of the local sites resulting from the rapid release of expanding high pressure air trapped within the soil cavities and fissures. The stagnated air mass must expand and, in so doing, causes the soil to violently fail in tension. In order to remove loosened soil from an excavation site, it has heretofore been common practice to employ a conventional hand shovel, which once again results in a time consuming manual labor operation. The present invention is particularly suited for use as a replacement for the manual shovel work for the removal of the loosened soil from an excavation site, and is particularly useful, in combination with the invention disclosed in the abovereferenced commonly assigned co-pending application.

The present invention is directed to a method and apparatus for withdrawing and conveying loosened soil, stones and like solids from an excavation site. The invention employs a jet of gas, preferably air, moving at supersonic velocities to create a high vacuum at an inlet end of the device and to provide a fast, efficient and safe technique for material removal in this heretofore labor-intensive and tedious task. The invention is suitable for use in many forms, such as a hand held tool, or it may be frame mounted on a mobile excavation machine, or it may be used in conjuction with a fully automated machine, such as, a robotic excavator apparatus, to name only a few of such potential applications.

The invention provides a device and method for safely excavating soil in close proximity to natural gas lines, water pipes, sewer lines, underground power cables, telephone lines and the like, which is extremely aggressive in soil removal while being completely harmless toward the buried objects, including those of a very fragile nature. The invention further provides significantly higher productivity than conventional hand methods, with virtually no likelihood of accidental destruction of subterranean objects. The high vacuum present at the inlet region of the device causes an evacuation of solid material from difficult to reach areas such as beneath or behind pipes, where shovels can not fit or are awkward to maneuver.

The invention in a preferred form utilizes a supersonic gas jet, the air supply for which is conveniently generated by a conventional air compressor unit of the same type which supplies compressed air to the supersonic jet excavation device of the co-pending patent application referred to above. The present invention provides a solids conveyance device which is simple to operate, safe to use and which is operable in conjunction with conventional, commercial air compressors. Still further, the invention is suitable for use in conveying a wide range of soils, from very dry and brittle types, to moist sands, loam and other gummy-type soils, while also being capable of conveying stones and rocks mixed therewith. The vacuum tube portion of the device is preferably constructed of lightweight materials, such as plastic or aluminum, thus making the apparatus less burdensome to operate while also rendering it non-sparking in explosive environments.

A hand-operated embodiment of the present invention incorporates a pneumatically efficient valve mechanism which employs the compressor reservoir gas at high pressure to open the valve against the same high pressure supply. The present invention further provides a high velocity vacuum solids conveyance device in which the gas injector nozzles are located outside of the flow path of the vacuum tube so as to minimize abrasive wear to the injector nozzles while, at the same time, increasing the throughput and efficiency of the device by providing an unobstructed constant cross-sectional flow path. The injector nozzles are aligned at a low angle of incidence relative to an axial centerline of the vacuum tube providing minimum abrasive wear to the bore sidewall surface as well as preventing an excessive formation of solids build-up within the bore at the section where the jets intersect. The invention further includes a mixing tube section downstream from the injector nozzles to provide for an adequate momentum exchange to produce a sensibly homogeneous suspension of solids moving under sensibly steady conditions. At a downstream, discharge end of the mixing tube, is a diffuser section which causes a deceleration of the gas stream in a relatively short distance, thereby providing a means of reducing the losses associated with the kinetic energy of the gas.

SUMMARY OF THE INVENTION

These as well as other advantages and desirable features are provided by the method and apparatus of the present invention. The apparatus of the invention employs a reservoir of pressurized gas, preferably air, supplied by a conventional air compressor, maintained at about 90–100 pounds per square inch, psi, or higher, the flow of which is regulated through appropriate valve means. The pressurized gas is supplied to hollow bored tube member which includes a solids inlet end and solids discharge end with a gas injector section positioned therebetween. Injector nozzle means, in the form of at least one, and preferably three or more, converging-/diverging-type nozzles, are positioned within the injector section having respective outlet ends directed toward the discharge end of the tube member. The converging/diverging configuration of the injector nozzle is critical in the creation of a supersonic air jet. In accordance with known principles of fluid mechanics, in nozzles of this type, the boundary conditions of supply pressure and ambient exit pressure can be so arranged to produce a choked sonic flow condition at the throat of the nozzle and a supersonic flow in the diverging section thereof. The diverging section is flared such that the gas accelerates smoothly, without shock waves, to produce a maximum velocity at the nozzle outlet. The chocked flow condition at the nozzle throat is a known phenomenon and occurs when the fluid mass flow rate attains a maximum value for a given throat area of the nozzle at given upstream conditions of temperature and pressure. The flow rate at the exit of the converging/diverging nozzle, thus, can be predicted by closely controlling the area ratio of the throat and outlet regions of the nozzle along with the pressure ratio of the gas pressure within the supply reservoir and the ambient exit pressure.

The aforesaid converging/diverging injector nozzles within the injector section of the hollow-tube member are in communication with the high pressure air within the compressor reservoir and direct a stream of supersonic air toward the discharge end of the tube member. This high velocity flow of air from the injector nozzle induces a secondary flow in the tube and creates a rise in total pressure across the device which, in turn, results in a vacuum on the upstream end of the injector section. Loose solids are rapidly drawn into the inlet end by the high suction and are conveyed through the bore of the tube member to exit at the discharge end thereof. A mixing tube section is provided between the injector section and the outlet end of the device to achieve a complete momentum exchange between the primary gas flow from the nozzles and the secondary flow comprising gas plus solids from the suction tube upstream of the injection section. The sized mixing tube produces a sensibly homogeneous suspension of solids moving under sensibly steady conditions therethrough. The outlet end of the device is also provided with a diffuser section comprising a flared tubular member which diverges exponentially from an inlet end to a discharge end, wherein the ratio of the cross-sectional area of the discharge end to the cross-sectional area of the inlet end is about 16 to 1. The diffuser section serves to decelerate the high velocity gas stream prior to exiting the discharge end of the diffuser section thus reducing the kinetic energy loss of the air and providing some decelerating effect on the solid particles. A containment device, preferably in the form of a pleated bag having an open bottom, is attached to the discharge end of the diffuser section to decelerate the entrained solids and discharge them through the open bottom thereof. The device further preferably includes inlet nozzle means positioned at the inlet end of the tube member comprising a cylindrically shaped member having an inside diameter greater than an outside diameter of the inlet end of the tube member. The nozzle member defines an open annular region between itself and the tube member which permits the passage of ambient air therethrough and into the inlet end of the tube member should the inlet orifice of the nozzle become obstructed. This annular region of the cylindrically shaped nozzle member is fitted with a plurality of aerodynamically shaped vane segments, positioned in spacedapart array to impart a swirling flow pattern to the ambient air drawn therethrough. This creates a vortex effect at the inlet orifice which serves to loosen any obstruction in that region, and to entrain particulate material.

Pressurized air from the air compressor reservoir is introduced into the injector section of the hollow tube member by way of a trigger actuated valve which is normally in a spring-biased, closed position. The valve is provided with a pilot air channel to direct the flow of high pressure reservoir air around the sealing head of the valve to overcome the high force caused by the pressurized air which normally maintains the valve in a closed position. In an open or activated position, the valve immediately opens to permit the pressurized air from the reservoir to pass through the valve body and into the injector section and, thence, to the converging-/diverging nozzles. The trigger mechanism is spring-biased to return to the closed position when the operator releases a grip thereon. The trigger shaft is also provided with a vent orifice which communicates with the interior of the valve to permit fast venting thereof when the valve is closed and which provides instantaneous shut-off. In addition, an air pressure gauge is also preferably provided on the handle to permit visual observation of the operating air pressure.

Briefly stated, according to a method of the present invention, a reservoir of compressed gas, preferably air, is provided normally at a pressure of about 90 psig. The flow of pressurized air is controlled and directed through appropriate means to a converging/diverging nozzle or nozzles which are positioned toward the discharge end of a tube. The converging/diverging nozzle includes a restricted throat section and a diverging section which terminates in an outlet section followed by a section or sections which produces Prandtl-Meyer expansion fans. The ratio between the cross-sectional area of the outlet section and the cross-sectional area of the throat section of the nozzle being greater than 1.0 and, preferably greater than about 1.7, while the ratio of the reservoir pressure to the exit pressure is greater than about 1.9 and, preferably greater than about 6.0, whereby, an air jet exits the nozzle, having a velocity greater than sonic and, preferably greater than about 2 times the speed of sound. The nozzle is oriented relative to a longitudinal axis of the tube at a low angle of incidence preferably of about 10° followed by a section which produces a Prandtl-Meyer expansion fan to further deflect the flow towards the axial direction and to increase the Mach number, whereby a high velocity jet emerges into the tube in a sensibly axial direction to provide a high vacuum upstream of the nozzle section for the conveyance of solid materials through the tube.

BRIEF DESCRIPTION OF THE DRAWINGS

Other objects and advantages of the present invention will become readily apparent upon reference to the accompanying description when taken in conjunction with the following drawings, wherein;

FIG. 2 is a side elevation view of a presently preferred embodiment of a high velocity vacuum tube apparatus of the present invention;

FIG. 3 is a cross-sectional view taken along line III—III of FIG. 2;

FIG. 6 is a partially fragmented, cross-sectional side view of the injector section shown in FIG. 4;

DETAILED DESCRIPTION OF THE INVENTION

Figure 1:
FIG. 1 is a pictorial representation of a high velocity vacuum conveyance device constructed in accordance with the present invention.

Referring now to the drawings, wherein like reference numerals indicate the same parts throughout the various views, a hand operated vacuum tube device constructed in accordance with the present invention is shown and designated generally by the reference numeral 2 therein. The high velocity vacuum tube device 2 of the present invention is useful in conveying loosened solid material away from holes, trenches and other hard to reach spaces which may be adjacent to buried pipe and conduit, such as the pipeline 4 depicted in FIG. 1. Solid granular material in the form of various sized clumps of soil and stones is pneumatically conveyed from for example the excavation site surrounding pipeline 4 through the high velocity vacuum tube device 2 to a remote location to the rear of the workman. High pressure air is supplied to the vacuum conveyance device 2 from the storage reservoir of a conventional air compressor unit 8. A hose 6 communicates with the storage reservoir of the compressor 8 and with the device 2. The air compressor is conventional, of the type generally used in construction work and capable of delivering about 125 cubic feet per minute air, at a reservoir pressure of about 90 pounds per square inch gauge (psig) at the outlet. The air hose 6 preferably has a minimum inside diameter of about 1 inch in order to handle the volume of air required for the intended purposes. The vacuum conveying device 2 is operably connected at threaded conduit fitting 36 to the air hose 6 by way of a conventional quick disconnect coupling (not shown) in a known manner, FIG. 2.

Still referring to FIG. 2, the high velocity vacuum tube device 2 comprises a hollow tubular pipe-like member having a bore 15 therethrough. The tubular member includes a suction tube section 10 with an inlet orifice 13' communicating with the internal bore 15. The suction tube section 10 is connected to a centrally located, hollow injector section 14 which is mounted above a handle and trigger assembly, generally designated 16, the operation of which will be explained in greater detail hereinafter. A mixing tube section 18 is positioned rearwardly of the centrally located injector section 14. The sections are arranged such that the tube 15 is of constant cross-sectional area and extends without obstruction through the device 2 from the inlet orifice 13' to an outlet diffuser portion 20 located at the terminal end of the mixing tube section 18.

An open-ended bag 22 is preferably mounted at the end of diffuser section 20 and is adapted to decelerate the conveyed solid materials and to permit their discharge through the opening 22° thereof to the ground, as depicted in FIG. 1. The bag 22 may include an open cage or frame to lend additional support thereto. A mud flap could also be fitted to the end of the cage to further decelerate and deflect the solids. The vacuum conveying device 2 also includes a first handle 24 and a second handle 28 to provide comfortable gripping means for the operator. The handle and valve assembly 16 also includes a trigger element 26 which is spring loaded to a normally deactivated position shown in FIG. 4. The operation of which will be explained in detail below.

The device 2 also preferably includes an air pressure gauge 30' mounted on the rear face of the handle and valve assembly 16, FIG. 3, to enable visual observation of the operating air pressure so as to ensure that optimum operating conditions are maintained.

Figures 4, 5:
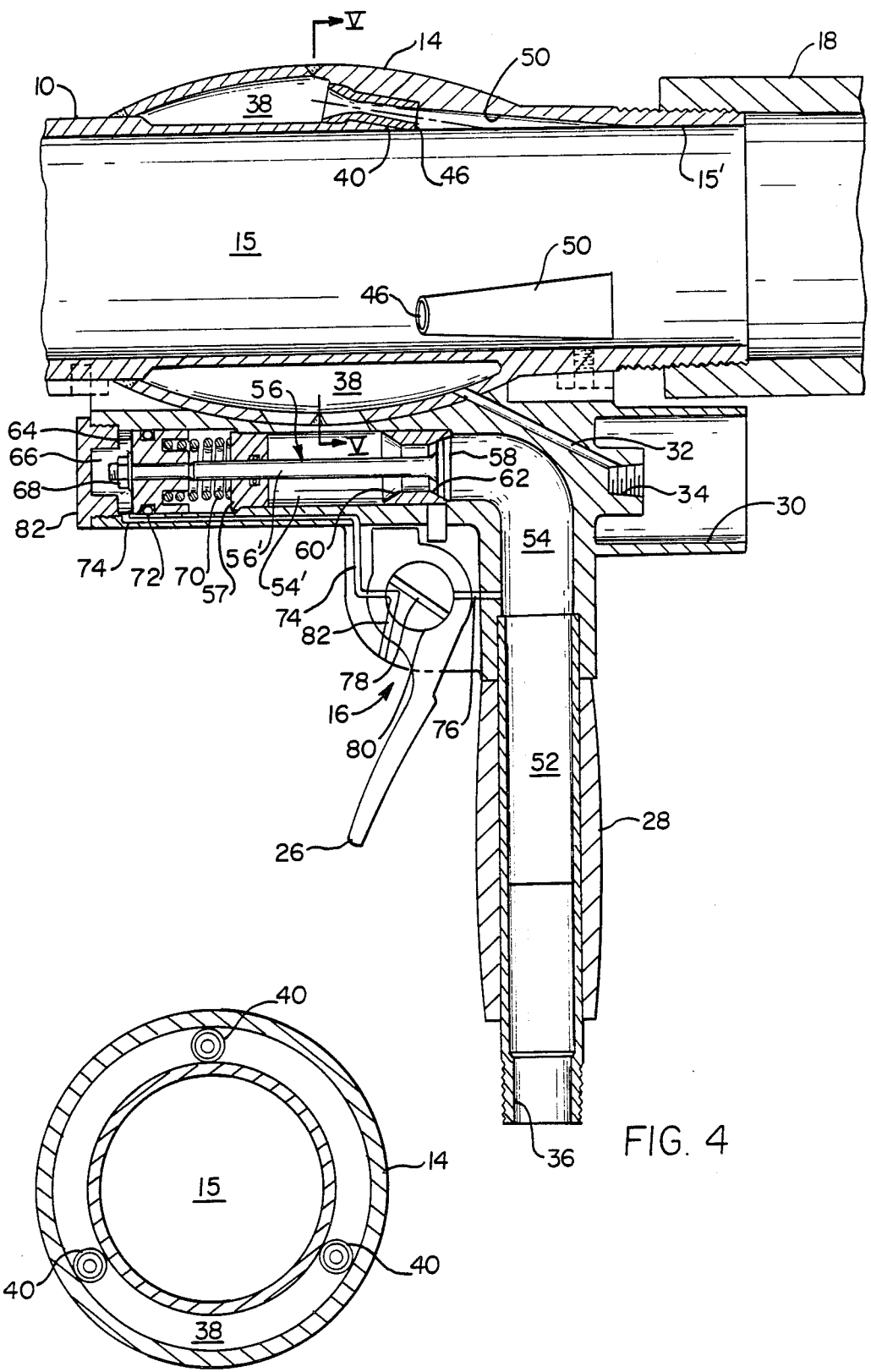
FIG. 4 is a partially fragmented, enlarged crosssectional view of the handle, valve assembly and injector sections of the apparatus of FIG. 2.
FIG. 5 is a cross-sectional view taken along line V—V of FIG. 4.

The handle and valve assembly 16 for regulating the flow of high pressure air through the conveying device 2 is shown in detail in FIG. 4. A threaded conduit 36 having a bore 52 is fitted within the handle grip 28 and is adapted to be placed in communication with the high pressure air hose 6 of air compressor 8. The bore 52 is in communication with a right angle bore 54 which is formed within the body of the handle and valve assembly 16. The high pressure inlet air within the bores 52 and 54 is sealed-off from the entry into injector section 14 by way of a valve member 56, when the trigger 26 is in the normally deactivated position shown in FIG. 4. The valve member 56 is movably positioned within a horizontal length of the bore 54, designated 54', and includes a circular head portion 58, having a tapered edge which sealably engages a tapered seat 62 carried by a sealing sleeve 60 which is fitted within the bore 54'. Sleeve 60 has a cylindrical bore formed therethrough which permits the passage of pressurized air when the valve 56 moves to the right and unseats the head 58 from the seat 62 in an open position. The valve stem portion 56' slidably moves through an apertured guide element 57 fitted within the bore 54'. A generally cylindrically shaped piston 64 is mounted on the valve stem 56' of the valve opposite the head portion 58. Piston 64 is slidably psotioned within a chamber 66 formed coaxially with the bore 54' and is secured to the valve stem 56' by way of a nut and washer assembly 68. The piston 64 also preferably contains an annular cut-out portion formed in the underside thereof to receive a coil spring 70 therein which normally biases the piston away from the guide element 57 to a closed position when the trigger 26 is deactivated. An "O"-ring 72 is also provided around the periphery of the piston 64 to minimize air leakage therearound. Chamber 66 is closed-off at one end by a threaded cap 82. The apertured guide element 57 is also fitted with an "O" ring sealing member within the central aperture to prevent leakage from the bore 54' along the valve stem 54'.

In a closed position depicted in FIG. 4, the valve head 58 is firmly held in place against the valve seat 62 by the substantial force exerted by the high pressure air within the bore 54. By way of example, if the surface area of the valve head 58 is 1 square inch and if the inlet air pressure within the bore 54 is 100 psi, then a force in excess of 100 pounds would be required to unseat the valve head 58 so as to permit the pressurized air to enter into the injector section 14 of the device. In order to overcome the large unseating forces required to open the valve 56, the valve assembly 16 is provided with a pilot air conduit 74 which communicates with the main pressurized air supply within the conduit 54 when the trigger mechanism 26 is moved to an activated position. The handle and valve assembly has a small diameter air inlet bore 76 formed therein which is adapted to communicate with a first end of a bore 78 formed in a cylindrically shaped trigger shaft 80. In the activated position, the trigger 26, and its integral cylindrical shaft 80, rotate within the handle and valve assembly 16 in a counterclockwise direction from the position of FIG. 4 to align the bores 78 and 76 to permit the flow of pressurized pilot air from bore 54 therethrough. A second end of bore 78 is adapted to communicate with the pilot air channel 74 to permit the flow of pressurized pilot air from the bore 54 to the chamber 66 adjacent to the valve piston head 64. The surface area of the face of piston 64 exposed to the pressurized air within chamber 66 is greater than the surface area of the valve head 58 which is exposed to the pressurized air in bore 54. Hence, when the trigger 26 is moved to the activated position, pilot air at line pressure flows through the bores 76, 78 and 74 to the chamber 66. Due to the fact that the surface area of the piston face 66 is greater than that of the valve head 58, an overall force differential occurs when the pressurized pilot air enters chamber 66, resulting in immediate movement of the valve 56 in a right hand direction in FIG. 4. This causes an unseating of the valve head 58 and permits the pressurized air from the reservoir of compressor 8 to enter into the bore 54' and then enter into an annular high pressure chamber 38 within the injector section 14. A bore 32 is formed within the valve and handle assembly 16 and communicates with the high pressure chamber 38 at a first end and with a threaded mounting bore 34 at a second end. Bore 32 permits the air pressure gauge 30' to communicate directly with the pressurized air within chamber 38. The gauge 30' is threadably secured within the mounting bore 34 and situated within the cylindrical cavity 30.

When the trigger element 26 is released, a coil spring (not shown) secured to the trigger shaft 80 causes the trigger 26 and shaft 80 to rotate in a clockwise direction to assume the closed position of FIG. 4. When this occurs, the higher force formerly supplied by the high pressure air in pilot orifice 74 no longer exists within the chamber 66 and the coil spring 70 forces the piston 64 to move in a left hand direction. At the same time, the line pressure within bore 54 acts on the valve head 58 to close and tightly seal the valve against the face 62 of the sealing sleeve 60 to immediately halt further entry of pressurized air within the chamber 38. During this closing step, pilot air trapped within the chamber 66 is exhausted in a reverse direction through the conduit 74 and vented through an orifice 82 formed partially within the trigger shaft 80 and assembly 16, as shown in FIG. 4.

At least one, and preferably three, injector nozzles 40 are fitted within the injector section 14 in communication with the high pressure chamber 38 and are adapted to direct a stream of air moving at supersonic speed toward the mixing tube section 18 within the bore 15 when the trigger 26 is activated. As perhaps best seen in FIGS. 4-6, each of the injector nozzles 40 are of the converging/diverging type and include a converging inlet section 42, a restricted throat portion 44 and a diverging outlet section 46. A longitudinal axis 48 of each nozzle 40 is aligned at a relatively shallow angle with respect to the longitudinal axis of the bore 15. The axis 48 of each injector nozzle is preferably aligned at an angle between about 10° to 15° relative to the longitudinal axis of the bore 15 or relative to the bore sidewall 15' as shown in FIG. 6. A low angle of incidence is preferred in order to increase the efficiency of the device and also to decrease the abrasive wear which may occur on the sidewall 15' and decrease the potential for build-up of certain moist or sticky materials along the sidewall 15' if the jet angle were to be increased.

The nozzles 40 are preferably spaced apart at 120° intervals around the circumference of the injector section 14, FIG. 5. The outlet ends 46 of the nozzles are located outside of the diameter of the bore 15, FIG. 4, so as to provide a clear passageway for the conveyed solids. This not only increases the efficiency of the device but also prevents undue abrasive wear to the nozzles 40. In order to achieve this offset orientation, each nozzle location preferably includes a recessed wall portion 50 which is angularly cut into the sidewall 15' at an angle of between about 5° to 7½°. In the supersonic regime, the air stream expands and accelerates as it flows around the angular section passing from the recessed wall 50 to the sidewall 15' in the form of a Prandtl-Meyer expansion fan to assume a flow pattern, sensibly parallel to the sidewall 15'.

As explained above, the high pressure air from the compressor 8 is introduced to the high pressure chamber 38 of the injector section 14 when the trigger 26 is moved to the activated position. In the science of fluid mechanics, it is known that the maximum flow rate for an ideal gas in frictionless adiabatic or isentropic flow (without heat addition or subtraction) through a converging nozzle is at a Mach number of one, which occurs at the throat section of the nozzle. The Mach number is defined herein as the ratio of the velocity of the air jet at the outlet 46 of the nozzle 40 to the velocity of sound at that point. It is also known that provided the ratio of the reservoir pressure to nozzle exit pressure is greater than 1.9, supersonic flow will occur if the nozzle area downstream from the nozzle throat 44 increases, thus, forming a converging/diverging nozzle of the type employed in the present invention. These same points are discussed in the co-pending, commonly assigned application referred to above and the disclosure thereof is incorporated by reference herein. Hence, it is known in the field of fluid mechanics that it is possible to obtain supersonic steady flow from a gas, such as air at rest in a reservoir, by first passing it through a converging nozzle section and then a diverging nozzle section. It is also known that the Mach number achieved by an air jet at the outlet of a converging-/diverging nozzle is influenced by a number of variables, such as the boundary conditions of pressure, namely, the supply pressure and the ambient exit pressure, as well as by the ratio of the area of the outlet to the area of the throat of the nozzle. When the supply pressure reaches a given threshold value, a choked sonic flow condition is achieved at the throat of the nozzle. The gas undergoes isentropic expansion from the sonic condition at the throat 44 to the diverging section 46 of the nozzle wherein the flow enters the supersonic regime, assuming that the boundary pressure and area conditions are satisfied.

In order to reach this desired sonic threshold, it is necessary to provide a ratio of the cross-sectional area of the outlet 46 to the cross-sectional area of the throat 44 having a value greater than 1. Through known formulas and calculations, tables have been created which list certain nozzle area ratios which are needed to achieve a given Mach value at given pressure ratios for the isentropic flow of dry air through a converging-/diverging nozzle section. Once again, these parameters are discussed and set forth in co-pending patent application, U.S. Ser. No. 877,280.

Higher Mach numbers are achieved as the ratio of the reservoir pressure to nozzle exit pressure increases and as the ratio of exit area to throat area of the nozzle increases. Table I is illustrative of this principle, for the isentropic flow of dry air:

TABLE I

| Mach No. | Po/P | A/A* |
|---|---|---|
| 1.0 | 1.895 | 1.00 |
| 1.5 | 3.675 | 1.176 |
| 2.0 | 7.830 | 1.685 |
| 2.5 | 17.075 | 2.629 |
| 3.0 | 36.644 | 4.213 |
| 3.5 | 75.926 | 6.739 |
| 4.0 | 150.796 | 10.612 | where:
Po=Reservoir pressure at compressor 8
P=Ambient pressure at nozzle exit
A=Area of nozzle at outlet 46
A*=Area of nozzle at throat 44

Using compressed air supplied to the high pressure chamber 38 and utilizing the principles of the converging/diverging nozzle followed by a section which produces a Prandtl-Meyer expansion for flow, we have discovered that the nozzles 40 deliver a supersonic jet of air within the mixing tube section 18 which creates an extremely high vacuum within the suction tube section 10 upstream from the injector section 14 of the device. We have discovered that when the high velocity air stream generated within the injector section as discussed above, is in the supersonic regime, the suction created at the inlet of the suction tube suction is dramatically superior to that of the subsonic vacuum cleaning devices of the prior art.

Figure 7:
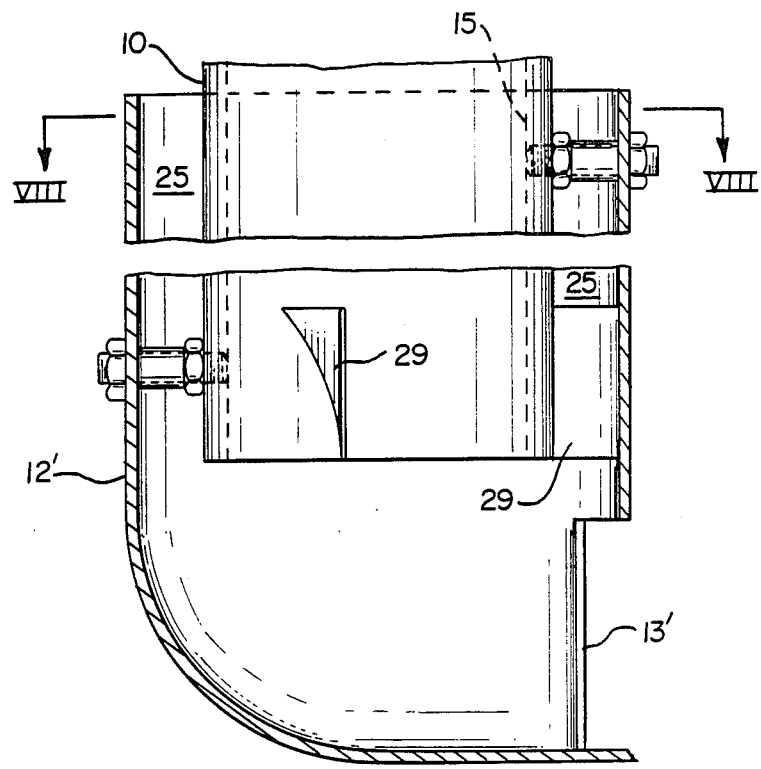
FIG. 7 is a partially fragmented, cross-sectional side view of an inlet nozzle affixed to the device of FIG. 2.
Figure 8:
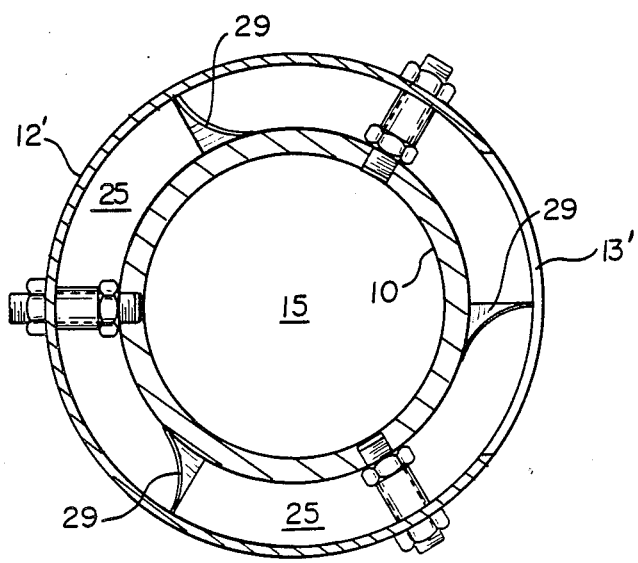
FIG. 8 is a cross-sectional view taken along line VIII—VIII of FIG. 7.

In order to further increase the efficiency of the apparatus 2 of the present invention, an inlet nozzle 12' is fitted at the inlet end of the suction tube 10 as seen in FIGS. 2, 7 and 8. The inlet nozzle 12' includes an inlet orifice 13' formed in a spoon-like offset manner on the sidewall thereof. The orifice 13' is slightly smaller than the diameter of the tube bore 15 so as to prevent the clogging of the bore 15 by oversized solid particles. Occasionally, larger sized rocks or clods of soil may become lodged at the inlet orifice 13'. In order to maintain the suction within the device 2 when such a blockage occurs, the inlet nozzle 12' has an inside diameter which is larger than the outside diameter of the suction tube section 10, whereby, an open annular region 25 is formed therebetween. When blockage of inlet orifice 13' occurs, ambient air is drawn downwardly through the annular region 25 and into the bore 15 of the suction tube section. In order to free such jammed solids at the orifice 13', a plurality of aerodynamically-shaped, vane segments 29 are positioned within the annular region 25, extending between the inside of the cylindrical nozzle member 12' and the outside of the tube 10. The vanes 29 create a swirling motion to the ambient air as it is sucked through the annular region 25. This swirling air creates a vortex which is sufficiently turbulent to dislodge and entrain any solids plugging the orifice 13' to maintain efficient operation of the device. In a presently preferred embodiment shown in FIG. 1, the nozzle 12 is in the shape of a right cylinder with the inlet orifice 13 formed at the bottom of the cylindrical nozzle 12 rather than in the offset spoon configuration of orifice 13' of FIGS. 2 and 7.

The presently preferred inlet nozzle 12 shown in FIG. 1 comprises a concentric tube of a diameter greater than the outside diameter of the suction tube 10 and is attached to the suction tube to provide an annular region equal to the area of the bore 15 of the suction tube. The nozzle tube 12 projects beyond the suction tube sufficiently to maintain a constant through-flow velocity in the annular region, in the suction tube and in the connecting region between the annular region and the suction tube. As in the spoon type inlet nozzle 12' of FIGS. 7 and 8, aerodynamically shaped vane segments 29 are positioned within the annular region 25 extending between the inside of cylindrical nozzle 12 and the outside of the suction tube 10.

For most manual operations, the diameter of the internal bore 15 is between about 3 inches to about 5 inches and preferably about 4 inches in diameter. The length of the mixing tube section 18 is preferably about 6 to 10 times the bore diameter and, hence, in the above example of a 3 inch tube, the length of the mixing tube section would range between about 18 inches to about 30 inches. This ratio of mixing tube length to bore diameter is important in order to achieve equilibrium flow conditions and to effect an adequate momentum exchange between the gas stream and the solids, to produce a sensibly homogeneous suspension moving under sensibly steady conditions. The transfer of energy from the supersonic jet nozzles 40 is effected by a momentum exchange which takes place in the mixing tube section 18 located immediately downstream of the exit plane of the nozzles.

A diffuser section 20 is included at the outlet end of the mixing tube section 18 to provide a means for decelerating the high velocity air stream. The diffuser section 20 has inlet end 21 of a diameter substantially equal to that of the mixing tube section 18 and a diverging discharge end 23 having a diameter substantially greater than that of the first end 21. The transitional section of the diffuser 20 between the inlet and discharge ends gradually diverges, exponentially, from the first to the second ends wherein the ratio of the cross-sectional area of the second end 23 to the crosssectionals area of the first end 21 is about 16 to 1. A pleated bag 22 having an open bottom portion 22' is fitted to the second end 23 of the diffuser section 20 to further decelerate the air and entrained solids to restrict the discharge of material to the atmosphere and to discharge the solids through the bottom thereof to any desired location rearwardly of the operator.

In order to stabilize the bag 22 to resist movement under the strong forces imposed by the exiting gas and solids streams, it may be advantageous to employ an open cage or frame-like structure (not shown) around or within the bag 22 so as to maintain the solids capturing ability thereof. A pivotally mounted mud flap (not shown) may also be employed at the discharge end 23 of the diffuser section 20 or on the above-mentioned cage to further decelerate the entrained solids.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An apparatus for conveying solid materials from an excavation site and the like, comprising:
   a hollow bored tube member of a substantially uniform diameter having a longitudinal axis extending therethrough; said tube member having an inlet end and a discharge end and including an injector section positioned therebetween, said tube member including a mixing tube section extending between the injector section and the discharge end, having a length to bore diameter ratio of between about 6 to 10; and
   nozzle means of the converging/diverging type positioned within said injector section, adjacent to but outside of the tube bore and directed toward the discharge end of the tube member, said nozzle means adapted to communicate with a reservoir containing a pressurized gas whereby said nozzle means is adapted to produce a stream of gas at supersonic velocity toward the discharge end of the tube member to create a high vacuum at the inlet end whereby loose solids and air are drawn into the inlet end and conveyed through said tube member entrained in a high velocity gas stream to exit at the discharge end thereof.

2. The apparatus of claim 1 wherein the nozzle means includes at least one nozzle having a throat section and an outlet section wherein each of said sections define a respective cross-section area and wherein the ratio of said outlet section area to said throat section area is greater than 1.0.

3. The apparatus of claim 2 wherein the ratio of the nozzle outlet section area to the throat section area is greater than about 1.685.

4. The apparatus of claim 2 wherein the nozzle means comprises three spaced-apart converging/diverging nozzles and wherein said injector section has a bore therethrough forming a portion of the bore of said tube member, said injector section also having three off-set segments formed therein at spaced-apart intervals around said bore for receiving each of said nozzles therein, said segments having an inner wall portion which is disposed at an angular relationship relative to the sidewall of the bore, whereby said nozzles are recessed inwardly from the sidewall of the bore.

5. The apparatus of claim 4 wherein each of the nozzles have a longitudinal axis which is inclined relative to the longitudinal axis of the bore of the tube member at an angle of between about 10° to about 15°.

6. The apparatus of claim 4 wherein the bore of said tube member has a diameter of between about 3 inches to about 5 inches.

7. The apparatus of claim 1 wherein the bore of said mixing tube section has a diameter of between about 3 inches to about 5 inches.

8. The apparatus of claim 1 wherein the tube member includes diffuser means positioned at the discharge end thereof adapted to decelerate the high velocity gas stream prior to exiting said apparatus.

9. The apparatus of claim 8 wherein the diffuser means comprises a flared tubular section having a first end having an inside diameter substantially equal to the bore diameter of the mixing tube section and a diverging transitional portion terminating in a second end having a diameter greater than that of said first end.

10. The apparatus of claim 9 including bag means attached to the tube member at the second end of the diffuser means adapted to decelerate the solids entrained in the gas stream.

11. The apparatus of claim 9 wherein the transitional portion of the diffuser means diverges exponentially from the first to second ends thereof and wherein the ratio of the cross-sectional area of the second end to the cross-sectional area of the first end is about 16 to 1.

12. The apparatus of claim 1 including nozzle means positioned at the inlet end of the tube member, said nozzle means having an orifice therein to permit the entry of solids therethrough.

13. The apparatus of claim 12 wherein the nozzle means further comprises a cylindrically shaped member having an inside diameter greater than an outside diameter of the inlet end of said tube member to define an open annular region therebetween which is adapted to permit the passage of ambient air therethrough and into the inlet end of the tube member should the orifice of said nozzle means become obstructed.

14. The apparatus of claim 13 wherein the nozzle means includes a means positioned within the annular region between the cylindrically shaped member and the outside diameter of the inlet end adapted to impart a swirling flow pattern to said ambient air whereby a vortex is created within said nozzle means to clear said obstruction in the orifice of said nozzle means.

15. The apparatus of claim 14 wherein said means for imparting a swirling flow pattern includes a plurality of aerodynamically shaped, vane segments positioned in a spacedapart array around said annular region.

16. The apparatus of claim 14 wherein said cylindrically shaped member of said nozzle means is a right cylinder having an open outward end portion forming the orifice of said nozzle means.

17. The apparatus of claim 14 wherein said cylindrically shaped member has the orifice formed through a sidewall thereof in a spoon-like, offset manner.

18. A method of conveying solid materials from an excavation site comprising:
   providing a hollow bored tube means having an inlet end and a discharge end and including an injector section therebetween having nozzle means of a converging/diverging type associated with said injector section;
   providing a reservoir of a gas at a pressure of at least 1.9 times greater than an ambient pressure adjacent an exit end of said nozzle means;
   transmitting said gas from said reservoir to said nozzle means to produce a gas stream exiting said nozzle means having a velocity within a supersonic regime;
   directing said supersonic gas stream within the hollow bore of said tube means toward the discharge end thereof, whereby a vacuum is created at the inlet end thereof; and
   sucking said solid materials into the inlet end of said tube means by said vacuum and conveying said solid materials entrained within said gas stream through said tube means for discharge at the discharge end thereof.

19. The method of claim 18 wherein the gas in the reservoir is air and is provided at a pressure of at least 3.675 times greater than the ambient pressure.

20. The method of claim 18 wherein the gas stream exiting said nozzle means is directed at an inclined angle of between about 10° to about 15° relative to a longitudinal axis of said hollow bore.

21. The method of claim 20 wherein the gas in the reservoir is air.

22. The method of claim 18 wherein the gas in the reservoir is air and is provided at a pressure of at least 7.83 times greater than the ambient pressure.

23. An apparatus for conveying solid materials from an excavation site and the like, comprising:

a hollow bored tube member having a longitudinal axis extending therethrough; said tube member having an inlet end and a discharge end and including an injector section positioned therebetween;

nozzle means of the converging/diverging type positioned within said injector section directed toward the discharge end of tube tube member, said nozzle means adapted to communicate with a reservoir containing a pressurized gas whereby said nozzle means is adapted to produce a stream of high velocity gas toward the discharge end of the tube member to create a high vacuum at the inlet end whereby loose solids are drawn into the inlet end and conveyed through said tube member to exit at the discharge end thereof, and wherein the nozzle means comprises three spaced-apart converging/diverging nozzles positioned within said injector section, each of said nozzles having a throat section and an outlet section wherein each of said sections defined a respective cross-section area and wherein the ratio of said outlet section area to said throat section area is greater than 1.0, said injector section also having three off-set segments formed therein at spaced-apart intervals around said tube bore for receiving each of said nozzles therein, said segments having an inner wall portion which is disposed at an angular relationship relative to the sidewall of the bore, whereby said nozzles are recessed inwardly from the sidewall of the bore, wherein each of the nozzles have a longitudinal axis which is inclined relative to the longitudinal axis of the bore of the tube member at an angle of between about 10° to about 15°, and wherein each of the inner wall portions of the off-set segments intersect with the sidewall of the bore at an angle of between about 5° to about 7½° to create at least one Prantdl-Meyer expansion fan per off-set segment.

24. An apparatus for conveying solid materials from an excavation site and the like, comprising:

a hollow bored tube member having a longitudinal axis extending therethough; said tube member having an inlet end and a discharge end and including an injector section positioned therebetween;

nozzle means of the converging/diverging type positioned within said injector section directed toward the discharge end of the tube member, said nozzle means adapted to communicate with a reservoir containing a pressurized gas whereby said nozzle means is adapted to produce a stream of high velocity gas toward the discharge end of the tube member to create a high vacuum at the inlet end whereby loose solids are drawn into the inlet end and conveyed through said tube member to exit at the discharge end thereof, and wherein the tube member includes a hollow bored mixing tube section located between the injector section and the discharge end thereof, said mixing tube section having a length of between 6 to about 10 times the bore diameter thereof;

said tube member further including diffuser means positioned at the discharge end thereof adapted to decelerate the high velocity gas stream prior to exiting said apparatus;

said diffuser means comprising a flared tubular section having a first end having an inside diameter substantially equal to the bore diameter of the mixing tube section and a diverging transitional portion terminating in a second end having a diameter greater than that of said first end; and a pleated fabric bag element having an open bottom portion attached to the diffuser means adapted to discharge said decelerated solids through said open bottom portion.

* * * * *